(12) United States Patent
Wang et al.

(10) Patent No.: US 7,248,767 B2
(45) Date of Patent: Jul. 24, 2007

(54) MULTIMODE OPTICAL FIBER COUPLER AND FABRICATION METHOD

(75) Inventors: Qinglin Wang, Sunnyvale, CA (US); Yanyan Ma, San Ramon, CA (US); Jianhua Wang, Saratoga, CA (US); Lixuan Xu, San Leandro, CA (US)

(73) Assignee: OptiWorks, Inc., Fremont, CA (US)

( * ) Notice: Subject to any disclaimer, the term of this patent is extended or adjusted under 35 U.S.C. 154(b) by 3 days.

(21) Appl. No.: 11/079,685

(22) Filed: Mar. 12, 2005

(65) Prior Publication Data
US 2005/0244105 A1     Nov. 3, 2005

Related U.S. Application Data

(60) Provisional application No. 60/552,815, filed on Mar. 13, 2004.

(51) Int. Cl.
*G02B 6/26* (2006.01)
(52) U.S. Cl. .............................. 385/46; 385/15; 385/39
(58) Field of Classification Search .................. 385/46

See application file for complete search history.

(56) References Cited

U.S. PATENT DOCUMENTS

| | | | |
|---|---|---|---|
| 4,291,940 A | 9/1981 | Kawasaki et al. | |
| 4,772,085 A | 9/1988 | Moore et al. | |
| 4,923,268 A * | 5/1990 | Xu | ............................ 385/50 |
| 5,355,426 A | 10/1994 | Dawiel et al. | |
| 7,046,875 B2 * | 5/2006 | Gonthier et al. | .............. 385/28 |

* cited by examiner

*Primary Examiner*—Jennifer Doan
(74) *Attorney, Agent, or Firm*—Billy Lau

(57) ABSTRACT

The present invention relates to a surface interaction type multimode optical fiber coupler. A representative embodiment of the present invention comprises a plurality of optical fibers with at least one having an expanded core section. Sections of the optical fibers including at least a portion of the expanded core sections are fused together forming a fused section. At least one of the optical fibers is suitable for multimode operations. According to an embodiment of the present invention, a method of fabrication an optical fiber coupler comprises: providing a plurality of optical fibers with at least one having an expanded core section; and maintaining sections of the optical fibers including at least a portion of the expanded core sections in contact and simultaneously heating at least a portion of the sections that are in contact to form a fused section until a predetermined end condition is reached.

37 Claims, 2 Drawing Sheets

SECTION X-X'

SECTION Y-Y'

MULTIMODE OPTICAL FIBER COUPLER AND FABRICATION METHOD

CROSS-REFERENCE TO RELATED APPLICATIONS

This application claims the benefit of Provisional Patent Application Ser. No. 60/552,815, filed by the present inventors on Mar. 13, 2004, which is incorporated by reference herein.

FIELD OF THE INVENTION

This invention generally relates to optical fiber technology. Particularly, this invention relates to a surface interaction type fused multimode optical fiber coupler.

BACKGROUND OF THE INVENTION

In the past, multimode optical fibers are employed primarily for short distance or low data rate communications. High data rate communications primarily employ single mode optical fibers. A representative optical fiber has a core surrounded by at least one cladding. When the optical fiber is packaged into an optical fiber cable, it may have a jacket or a coating for protecting the core and the cladding. Because the jacket and the coating are not related to the function of the present invention, they will not be included in the specification. One skilled in the art understands that the jacket or the coating may have to be removed before processing an optical fiber cable. For International Telecommunication Union (ITU) data communication and telecommunication applications, a representative industry standard single mode optical fiber has a core diameter or a mode field diameter in the neighborhood of 9 μm and a cladding outer diameter in the neighborhood of 125 μm, and a representative industry standard multimode mode optical fiber has a core diameter in the neighborhood of 50 μm to 62.5 μm and a cladding outer diameter in the neighborhood of 125 μm. These representative industrial standard optical fibers are made from silica. The ITU industry standard single mode optical fiber is suitable for single mode operations and supports a single propagation mode for light of wavelengths defined by ITU for data communication and telecommunication systems. The industry standard multimode optical fiber is suitable for multimode operations and supports multiple propagation modes for light of wavelengths defined by ITU for data communication and telecommunication systems. Light generally propagates through a multimode optical fiber at different speeds in different propagation modes. Consequently, light disperses over a relatively short distance when propagating in multiple propagation modes through a multimode optical fiber when compared to propagating in a single propagation mode through a single mode optical fiber. One skilled in the art understands that for different wavelengths, optical fiber materials, and applications, the core diameters and the cladding diameters of a single mode optical fiber and a multimode optical fiber may be different from those of the representative ITU industry standard single mode optical fiber and multimode optical fiber.

The costs of multimode optical components and multimode optical communication systems are generally lower than the costs of the corresponding single mode optical components and single mode optical communication systems. Recently, cost concerns have driven up the use of multimode optical components and multimode communication systems in high data rate communication applications in place of single mode optical components and single mode optical communication systems. One of the high volume optical components in optical communication applications is the optical fiber coupler, particularly the fused optical fiber coupler. Technologies for fabricating a high performance single mode fused optical fiber coupler are understood by many skilled in the art. Fabricating a high performance multimode fused optical fiber coupler, which is suitable for demanding communication applications, however, is a challenge.

There are two major types of fused optical fiber couplers, the surface interaction type and the core interaction type. A representative fabrication method of the core interaction type fused optical fiber coupler includes the step of maintaining the ends of a plurality of optical fibers in contact and fusing the ends of optical fibers together. In a core interaction type fused optical fiber coupler, light propagates from a core end of an optical fiber to a core end of another optical fiber through butt coupling. Core interaction type fused optical fiber couplers are not related to the present invention.

The optical fibers in a surface interaction type fused optical fiber coupler primarily couple through the sides of the optical fibers. Selected side surfaces of the optical fibers are placed in close proximity and fused. The present invention relates to a surface interaction type fused optical fiber coupler. A representative conventional surface interaction type multimode optical fiber coupler is the fused biconical taper multimode optical fiber coupler. The fused biconical taper multimode optical fiber coupler is fabricated according to the fused biconical tapering method. A representative fused biconical tapering method comprises the steps of: twisting a section of a first multimode optical fiber with a section of a second multimode optical fiber and setting up to monitor the optical characteristic of the multimode optical fibers; heating at least a portion of the twisted section to form a fused section and tapering the fused section by pulling the two multimode optical fibers from both sides of the fused section to elongate the fused section until a predetermined optical characteristic is obtained or a predetermined end condition is reached. According to the fused biconical tapering method, a high degree of tapering is important to the fabrication of a high performance optical fiber coupler. Tapering promotes the escape of light propagating in the core of an optical fiber to the cladding and the conversion of light propagating in the cladding of an optical fiber to light propagating in the core. As a result of a high degree of tapering, the cross-sectional area of the fused section of a fused biconical taper optical fiber coupler is typically much smaller than the sum of the cross-sectional areas of the optical fibers. The heating is typically accomplished with an oxyhydrogen flame.

FIG. 1 shows the configuration of a representative conventional fused biconical taper multimode optical fiber coupler. Referring to FIG. 1, the representative conventional fused biconical taper multimode optical fiber coupler comprises a first multimode optical fiber 1 and a second multimode optical fiber 2. First multimode optical fiber 1 and second multimode optical fiber 2 share a fused section 3. Section X–X' is a representative cross-sectional view of first multimode optical fiber 1 and second multimode optical fiber 2. First multimode optical fiber 1 has a first core 11 and a first cladding 12. Second multimode optical fiber 2 has a second core 21 and a second cladding 22. Section Y–Y' is a representative cross-sectional view of fused section 3. The total cross-sectional area at section X–X' is the sum of the cross-sectional areas of first multimode optical fiber 1 and second multimode optical fiber 2. The cross-sectional area at section Y–Y' is the cross-sectional area of fused section 3. The cross-sectional area at section Y–Y' is much smaller than the total cross-sectional area at sectional X–X' because of the high degree of tapering of fused section 3 during fabrication. For many representative conventional fused biconical taper multimode optical fiber couplers, the cross-sectional area at section Y–Y' is typically about ten percent of the total cross-sectional area at sectional X–X'. While test data indicate that fused biconical taper single mode optical fiber couplers enjoy superb performance, test data show that the representative conventional fused biconical taper multimode optical fiber couplers are less than desirable in some demanding applications.

There are numerous technical challenges in fabricating a multimode optical fiber coupler. One of the technical challenges that is unique to fabricating a multimode optical fiber coupler and have no equivalence in fabricating a single mode optical fiber coupler is overcoming mode sensitivity with little added insertion loss. Many multimode optical fiber couplers exhibit mode sensitivity in key optical parameters, including, for example, insertion loss and coupling ratio. Consequently, the optical parameters of a multimode optical fiber coupler may depend on the mode distribution profile of the multimode light source that provides the light propagating in the multimode optical fiber coupler and the launch method for launching light from the multimode light source into the multimode optical fiber coupler. Therefore, mode sensitivity in a multimode optical fiber coupler is undesirable for many applications. An approach for reducing the mode sensitivity of a multimode optical fiber coupler is to over-fuse the fused section and form an over-fused multimode optical fiber coupler. In an over-fused multimode optical fiber coupler, the cores of the optical fibers are very close together or fused together in the over-fused fused section. Unfortunately, the over-fused fused sections of many representative conventional over-fused fused biconical taper multimode optical fiber couplers are highly tapered. Highly tapered fused biconical taper multimode optical fiber couplers are likely to exhibit high insertion loss.

The second technical challenge is fabricating a mode-insensitive or reduced-mode-sensitivity multimode optical fiber coupler with uneven optical coupling between its optical fibers. Many representative over-fused fused biconical taper multimode optical fiber couplers have even optical coupling, that is, 50/50 coupling ratio for a 2×2 multimode optical fiber coupler. Many applications, however, demand multimode optical fiber couplers with uneven optical coupling, including, for example, 60/40, 70/30, 80/20, 90/10, 95/5, and 99/1 coupling ratios for a 2×2 multimode optical fiber coupler.

SUMMARY OF THE INVENTION

The present invention relates to a surface interaction type multimode optical fiber coupler. A representative embodiment of the present invention comprises a plurality of optical fibers with at least one having an expanded core section. Sections of the optical fibers including at least a portion of the expanded core sections are fused together forming a fused section. At least one of the optical fibers is suitable for multimode operations. According to an embodiment of the present invention, a method of fabrication an optical fiber coupler comprises: providing a plurality of optical fibers with at least one having an expanded core section; and maintaining sections of the optical fibers including at least a portion of the expanded core sections in contact and simultaneously heating at least a portion of the sections that are in contact to form a fused section until a predetermined end condition is reached. Selected embodiments of the present invention are suitable for uneven optical coupling operations.

DESCRIPTION OF THE DRAWINGS

A better understanding of the invention may be gained from the consideration of the following detailed descriptions taken in conjunction with the accompanying drawings in which.

DETAILED DESCRIPTION OF THE INVENTION

Figure 1:
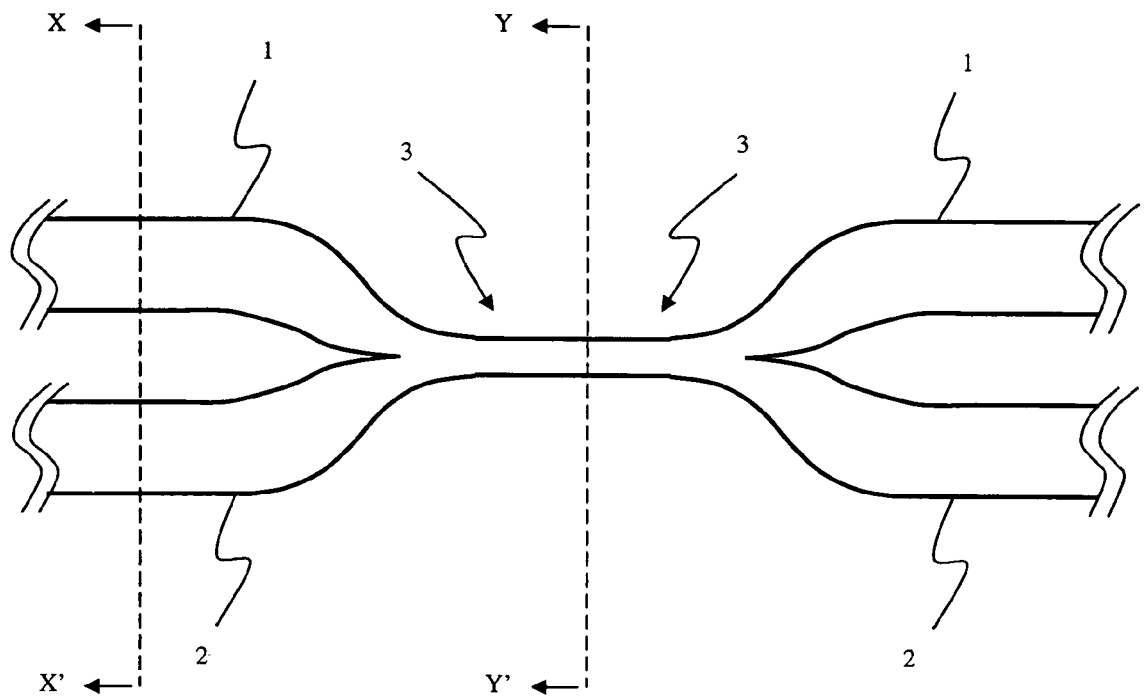
FIG. 1 shows the configuration of a conventional multimode optical fiber coupler.
Figure 1:
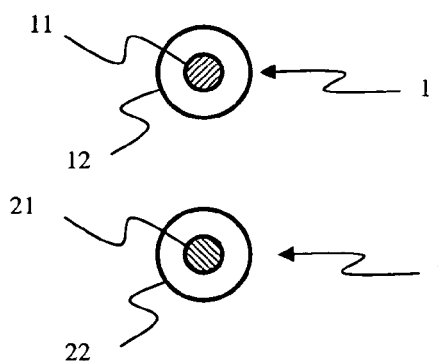
Figure 1:

In the description that follows, like parts are indicated throughout the specification and drawings with the same reference numerals. Further, optical fiber coupler refers to surface interaction type fused optical fiber coupler and regular optical fiber refers to optical fiber that has a substantially uniform core diameter unless explicitly stated otherwise. The present invention is not limited to the specific embodiments illustrated herein.

An example embodiment of the present invention employs an expanded core optical fiber in place of a regular multimode optical fiber in a conventional multimode optical fiber coupler. An expanded core optical fiber is an optical fiber that includes at least one expanded core section. In an expanded core optical fiber, the core diameter in the expanded core section is substantially larger than the core diameter of the other sections. There are numerous methods for fabricating an expanded core optical fiber, including, for example, the thermal core expansion method. The thermal core expansion method includes the step of heating an optical fiber section at high temperatures without melting it. In the heated optical fiber section, the dopants in the core thermally diffuse into the cladding and the core diameter increases. An expanded core optical fiber having an expanded core section formed by thermally diffusing the core into the cladding is commonly referred to as a thermally expanded core optical fiber. Thermally expanded core optical fibers are also known as thermally-diffused expanded core optical fibers. Thermally expanded core optical fibers are well understood by one skilled in the art. Optical fibers with thermally expanded cores at fiber ends are commercially available. The time required to significantly expand the core diameter of an optical fiber employing the thermal core expansion method is much longer than the time required to fuse two optical fibers in most cases. An expanded core section may also be created in an optical fiber, for example, in the optical fiber manufacturing process. Further, a second expanded core optical fiber can be made from splicing a first expanded core optical fiber that has an expanded core end section with another optical fiber that has a core diameter similar to the core diameter of the first expanded core optical fiber at the splice.

Figure 2:
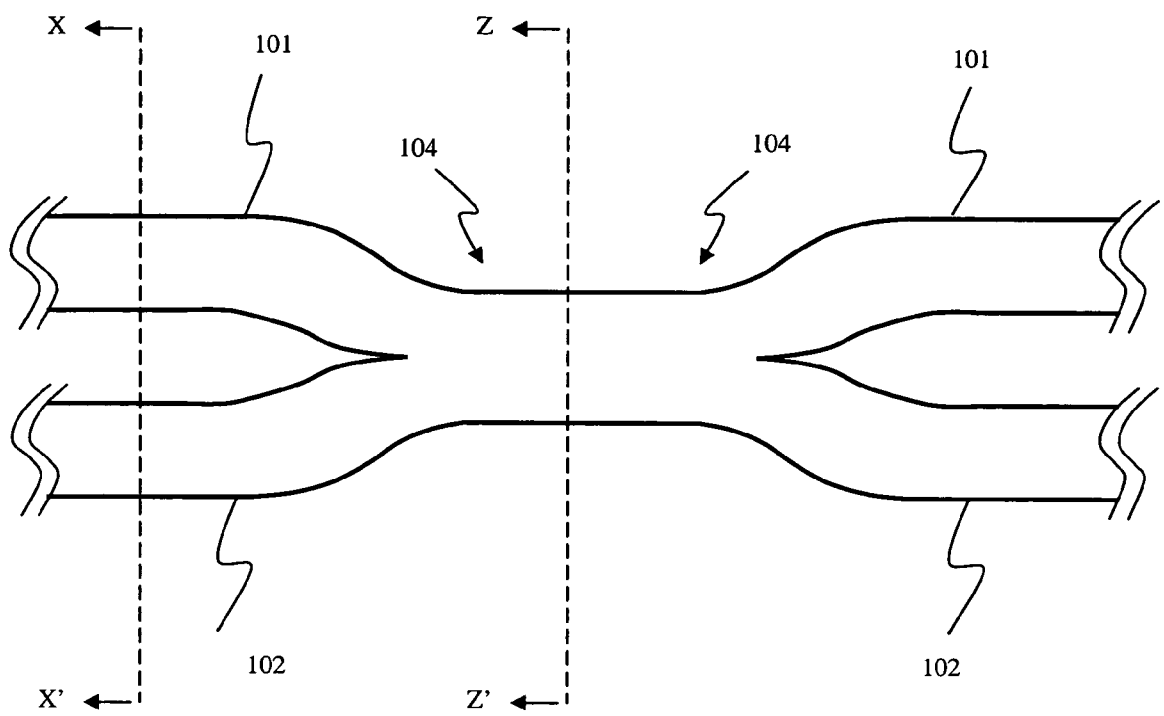
FIG. 2 shows the configuration of an embodiment of the present invention.
Figure 2:
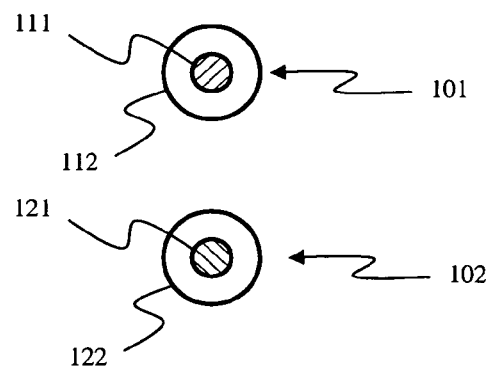
Figure 2:
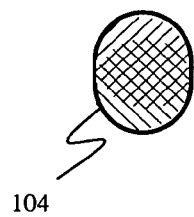

FIG. 2 shows the configuration of an embodiment of the present invention. Referring to FIG. 2, the embodiment comprises a first multimode thermally expanded core optical fiber 101 and a second multimode thermally expanded core optical fiber 102. First multimode thermally expanded core optical fiber 101 and second multimode thermally expanded core optical fiber 102 share a fused section 104. Optionally, fused section 104 is substantially over-fused. Section X–X' is a cross-sectional view of first multimode thermally expanded core optical fiber 101 and second multimode thermally expanded core optical fiber 102. First multimode thermally expanded core optical fiber 101 has a first core 111 and a first cladding 112. Second multimode thermally expanded core optical fiber 102 has a second core 121 and a second cladding 122. At least one of the multimode thermally expanded core optical fibers has an expanded core section in fused section 104. Optionally, the expanded core section extends from and beyond fused section 104 along the multimode thermally expanded core optical fiber in at least one direction. At section X–X', the core diameters of first multimode thermally expanded core optical fiber 101 and second multimode thermally expanded core optical fiber are not expanded. Section Z–Z' is a cross-sectional view of fused section 104. The total cross-sectional area at section X–X' is the sum of the cross-sectional areas of first multimode thermally expanded core optical fiber 101 and second multimode thermally expanded core optical fiber 102. The cross-sectional area at section Z–Z' is the cross sectional area of fused section 104. For an example optical fiber coupler according to an embodiment of the present invention that has a 60/40 coupling ratio, the cross-sectional area at section Z–Z' is typically but is not limited to in the neighborhood of approximately seventy percent to one hundred percent of the total cross-sectional area at sectional X–X'. In an optical fiber system that employs optical fibers with a predetermined core diameter, the used of an embodiment of the present invention that employs multimode thermally expanded core optical fibers 101 and 102 with unexpanded core diameters that are similar to the predetermined core diameter in the optical fiber system may avoid insertion losses resulting from splice optical fibers with dissimilar core diameters.

According to the present invention, the coupling ratio of an embodiment depends on numerous factors. For example, one of the factors is the ratio of the core diameters of multimode thermally expanded core optical fibers 101 and 102 in the neighborhood of fused section 104. The ratio of core diameters may be different between the ends of fused section 104. By selecting the core diameter of multimode thermally expanded cores optical fibers 101 and 102 in the neighborhood of fused section 104, the coupling ratio can be varied. Further, the coupling ratio of a selected multimode optical fiber coupler, including an example embodiment of the present invention, may be varied after the forming of fused section 104 by thermally expanding the core of optical fibers of the multimode optical fiber coupler in the neighborhood of fused section 104.

According to an embodiment of the present invention, a method of fabricating a multimode optical fiber coupler comprises: maintaining at least a portion of a first expanded core section of first multimode thermally expanded core optical fiber 101 in contact with at least a portion of a second expanded core section of second multimode thermally expanded core optical fiber 102; and heating at least a portion of the sections that are in contact to form fused section 104 until a predetermined end condition is reached. Optionally, the method comprises thermally expanding the core of at least one of the multimode thermally expanded core optical fibers during the heating of the sections. Examples of predetermined end conditions include but are not limited to: reaching a predetermined set of optical characteristics; completing a predetermined temperature profile; reaching a predetermined fused section length; reaching a predetermined set of physical characteristics; reaching a predetermined processing time; completing a predetermined process; reaching a predetermined mode sensitivity level; fused section 104 is formed; fused section 104 is substantially over-fused; or a selected combination thereof. One skilled in the art understands that heating fused section 104 of a multimode optical fiber coupler over an extended time period may reduce the mode sensitivity level of the multimode optical fiber coupler until the mode sensitivity reaches a saturation level. When the mode sensitivity of a multimode optical fiber coupler is at the saturation level, its fused section 104 is over-fused. After reaching the saturation level, the mode sensitivity of a multimode optical fiber coupler will not substantially decrease with additional heating and elongating of fused region 104.

The heating of optical fibers is accomplished through a high temperature heat source. Examples of high temperature heat sources include but are not limited to an oxyhydrogen flame, a micro electric heater, a laser, and a selected combination thereof. Example methods of maintaining the first expanded core section of first multimode thermally expanded core optical fiber 101 in contact with the second expanded core section of second multimode thermally expanded core optical fiber 102 include but not limited to applying tension on the two sides of the fused section of at least one of the multimode thermally expanded core optical fibers; vertically stacking the multimode thermally expanded core optical fiber sections; laying the multimode thermally expanded core optical fiber sections side-by-side; twisting the multimode thermally expanded core optical fiber sections together; mounting the multimode thermally expanded core optical fiber sections on a fixture designed to force the multimode thermally expanded core optical fiber sections to be in contact; mounting the multimode thermally expanded core optical fiber sections on a fixture designed to fuse with the multimode thermally expanded core optical fiber sections; or a selected combination thereof. The amount of twist in the multimode thermally expanded core optical fiber sections may be from a fraction of a degree to many turns.

Optionally, prior to maintaining multimode thermally expanded core optical fibers 101 and 102 in contact during fabrication, at least one of the multimode thermally expanded core optical fibers may be pretreated. One skilled in the art readily understands pretreatment methods for optical fibers. Examples of pretreatment methods for a multimode thermally expanded core optical fiber include but are not limited to: etching; tapering or elongating under high temperatures; mechanical abrasion; and a combination thereof.

Various temperature profiles may be employed to heat the sections of the multimode thermally expanded core optical fibers that are kept in contact. Through selecting a temperature profile, the core in a section of a multimode thermally expanded core optical fiber may be further expanded and may be further expanded to the whole cladding in the section. Heating a multimode thermally expanded core optical fiber section to temperatures below the fusing temperature of the multimode thermally expanded core optical fiber thermally expands the core of the heated section of the multimode thermally expanded core optical fiber and increases the core diameter in that heated section. Heating the sections of the multimode thermally expanded core optical fibers in contact to temperatures in the neighborhood of and above the fusing temperature fuses the multimode thermally expanded core optical fiber sections. Fusing the multimode thermally expanded core optical fibers and thermally expanding the cores of the multimode thermally expanded core optical fibers may be completed in any order, repeated, interleaved, or a combination thereof. By heating the sections of the multimode thermally expanded core optical fibers that are maintained in contact to high temperatures below the fusing temperature for an extended time period and then raising those sections to the fusing temperature, the cores of the section of multimode thermally expanded core optical fibers thermally expand before fused region 104 is formed.

There are numerous variations to the embodiments discussed above which will be trivial to the one skilled in the art. Examples of these variations include but are not limited to:

A multimode thermally expanded core optical fiber may be replaced by a multimode expanded core optical fiber;

At least one of the multimode thermally expanded core optical fibers is replaced by a regular multimode optical fiber;

A multimode optical fiber may be replaced by a single mode optical fiber;

The expanded core section is at fiber end;

At least one additional multimode expanded core optical fiber is fused to fused section 104;

All or selected multimode expanded core optical fibers may be elongated at fused section 104;

Elongation of a multimode expanded core optical fiber may be accomplished through applying tension to the multimode expanded core optical fiber at high temperatures;

The expanded core section of at least one of the multimode expanded core optical fibers is completely in fused section 104;

The expanded core section of at least one of the optical fibers extends from and beyond fused section 104;

An embodiment is adapted to be a M×N multimode optical fiber coupler, where N is an integer of at least two and M is an integer between one and N inclusive;

An example method of fabricating a M×N multimode optical fiber coupler is fabricating a N×N optical fiber coupler and then removing the unused multimode expanded core optical fiber ends;

During fabrication, through controlling for example the temperature profile, a section of the core of at least one of the multimode expanded core optical fibers thermally expands;

During fabrication, through controlling for example the temperature profile, a section of the core of at least one of the optical fibers thermally expands before the forming of fused section 104;

During fabrication, through controlling for example both the temperature profile in time and temperature profile in position, the thermally expanded core section and the fused section of an multimode expanded core optical fiber such as multimode expanded core optical fibers 101 and 102 may be made different;

During fabrication, when maintaining sections of optical fibers in contact, a section of an optical fiber may be but is not necessary in contact with only a section of one other optical fiber; and A selected combination or subcombination of the above.

Although the embodiment of the invention has been illustrated and that the form has been described, it is readily apparent to those skilled in the art that various modifications may be made therein without departing from the spirit of the invention.

What is claimed is:

1. An optical fiber coupler, comprising:
   a plurality of optical fibers; and
   a fused section formed by fusing sections from said optical fibers together;
   wherein:
   each of said optical fibers optically couples with at least one other said optical fiber through surface interaction type optical coupling in said fused section;
   at least one of said optical fibers is suitable for multimode operations;
   at least one of said optical fibers comprises an expanded core section;
   at least a portion of said expanded core section is in said fused section;
   all of said optical fibers have substantially the same core diameter outside said expanded core section and the neighborhood of said fused section; and
   said optical fiber coupler is suitable for substantially uneven optical coupling operations.

2. The optical fiber coupler as claimed in claim 1, wherein, the average cross-sectional area of said fused section averaged over said fused section is at least approximately seventy percent of the sum of the cross-sectional areas of all said optical fibers that are measured outside said expanded core sections and the neighborhood of said fused section.

3. The optical fiber coupler as claimed in claim 2, wherein, the average cross-sectional area of said fused section averaged over said fused section is at least approximately eighty five percent of the sum of the cross-sectional areas of all said optical fibers that are measured outside said expanded core sections and the neighborhood of said fused section.

4. An optical fiber coupler, comprising:
   a plurality of optical fibers; and
   a fused section formed by fusing sections from said optical fibers together;
   wherein:
   each of said optical fibers optically couples with at least one other said optical fiber through surface interaction type optical coupling in said fused section;
   at least one of said optical fibers is suitable for multimode operations;
   at least one of said optical fibers comprises an expanded core section;
   at least a portion of said expanded core section is in said fused section;
   the core diameter of said expanded core section of said optical fiber is different from the core diameter of at least one other said optical fibers; and
   at least one of said optical fibers comprises an expanded core section extending from and beyond said fused section along said optical fiber in at least one direction.

5. The optical fiber coupler as claimed in claim 4, wherein, the average cross-sectional area of said fused section averaged over said fused section is at least approximately seventy percent of the sum of the cross-sectional areas of all said optical fibers.

6. The optical fiber coupler as claimed in claim 5, wherein, the average cross-sectional area of said fused section averaged over said fused section is at least approximately eighty five percent of the sum of the cross-sectional areas of all said optical fibers.

7. An optical fiber coupler, comprising:
a plurality of optical fibers; and
a fused section formed by fusing sections from said optical fibers together;
wherein:
each of said optical fibers optically couples with at least one other said optical fiber through surface interaction type optical coupling in said fused section;
at least one of said optical fibers is suitable for multimode operations;
at least one of said optical fibers comprises an expanded core section;
at least a portion of said expanded core section is in said fused section;
the core diameter of said expanded core section of said optical fiber is different from the core diameter of at least one other said optical fibers;
at least one of said optical fibers comprises an expanded core section extending from and beyond said fused section alone said optical fiber in at least one direction; and.
each of said optical fibers is suitable for multimode operations and further comprises an expanded core section.

8. The optical fiber coupler as claimed in claim 4, wherein, said fused section is substantially over-fused.

9. The optical fiber coupler as claimed in claim 4, wherein, the core diameter of at least one of said optical fibers is substantially different from the core diameter of at least one of other said optical fibers at an end of said fused section.

10. The optical fiber coupler as claimed in claim 9, wherein, said optical fiber coupler is suitable for uneven optical coupling operations.

11. The optical fiber coupler as claimed in claim 10, wherein, said expanded core section comprises a thermally expanded core section.

12. An optical fiber coupler, comprising:
a plurality of optical fibers; and
a fused section formed by fusing sections from said optical fibers together;
wherein:
each of said optical fibers optically couples with at least one other said optical fiber through surface interaction type optical coupling in said fused section;
at least one of said optical fibers is suitable for multimode operations;
at least one of said optical fibers comprises an expanded core section;
at least a portion of said expanded core section is in said fused section;
the core diameter of said expanded core section of said optical fiber is different from the core diameter of at least one other said optical fibers;
the core diameter of at least one of said optical fibers is substantially different from the core diameter of at least one of other said optical fibers at an end of said fused section;
said optical fiber coupler is suitable for uneven optical coupling operations;
said expanded core section comprises a thermally expanded core section; and
at least one of said optical fibers comprises an expanded core section extending from and beyond said fused section along said optical fiber in at least one direction.

13. The optical fiber coupler as claimed in claim 12, wherein, said fused section is substantially over-fused.

14. The optical fiber coupler as claimed in claim 13, wherein, the average cross-sectional area of said fused section averaged over said fused section is at least approximately seventy percent of the sum of the cross-sectional areas of all said optical fibers.

15. The optical fiber coupler as claimed in claim 14, wherein, each of said optical fibers is suitable for multimode operations.

16. The optical fiber coupler as claimed in claim 4, wherein, said optical fiber coupler is suitable to be a MxN multimode optical fiber coupler, where N is an integer of at least two and M is an integer between one and N inclusive.

17. The optical fiber coupler as claimed in claim 4, wherein, a least one of said optical fibers comprises a single mode optical fiber.

18. An optical fiber coupler, comprising:
a plurality of optical fibers; and
a fused section formed by fusing sections from said optical fibers together;
wherein:
each of said optical fibers optically couples with at least one other said optical fiber through surface interaction type optical coupling in said fused section;
at least one of said optical fibers is suitable for multimode operations;
at least one of said optical fibers comprises an expanded core section;
at least a portion of said expanded core section is in said fused section; and
at least a portion of said expanded core section extends from and beyond said fused section along said optical fiber in at least one direction.

19. An optical fiber coupler, comprising:
a first multimode optical fiber having a first section; and
a second multimode optical fiber having a second section fused with said first section forming a fused section;
wherein:
said first multimode optical fiber and said second multimode optical fiber optically couple through surface interaction type optical coupling in said fused section;
at least one of said multimode optical fibers comprises an expanded core section;
the core diameter of said expanded core section of said multimode optical fiber is different from the core diameter of the other multimode optical fiber;
at least a portion of said expanded core section is in said fused section; and
at least one of said multimode optical fibers comprises an expanded core section extending from and beyond said fused section along said multimode optical fiber in at least one direction.

20. The optical fiber coupler as claimed in claim 19, wherein, the average cross-sectional area of said fused section averaged over said fused section is at least approximately seventy percent of the sum of the cross-sectional areas of all said multimode optical fibers.

21. The optical fiber coupler as claimed in claim 20, wherein, the average cross-sectional area of said fused section averaged over said fused section is at least approximately eighty five percent of the sum of the cross-sectional areas of all said multimode optical fibers.

22. The optical fiber coupler as claimed in claim 19, wherein, said fused section is substantially over-fused.

23. The optical fiber coupler as claimed in claim 19, further comprises, at least a third multimode optical fiber having a section fused with said fused section and optically coupling with at least one of other said multimode optical fibers through said fused section.

24. A method of fabricating an optical fiber coupler, comprising:
   providing a plurality of optical fibers with at least one of said optical fibers having at least an expanded core section and at least one of said optical fibers being suitable for multimode operations; and
   maintaining sections of said optical fibers in contact and simultaneously heating at least a portion of said sections that are in contact to form a fused section until a predetermined end condition is reached so that at least a portion of said expanded core section of at least one of said optical fibers is in said fused section; wherein each of the optical fibers optically couples with at least one other said optical fiber through surface interaction type optical coupling in said fused section and at least a portion of said expanded core section extends from and beyond said fused section.

25. The method of fabricating an optical fiber coupler as claimed in claim 24, wherein, said optical fiber coupler is suitable for uneven optical coupling operations.

26. A method of fabricating an optical fiber coupler, comprising:
   providing a plurality of optical fibers with at least one of said optical fibers having at least an expanded core section and at least one of said optical fibers being suitable for multimode operations;
   maintaining sections of said optical fibers in contact and simultaneously heating at least a portion of said sections that are in contact to form a fused section until a predetermined end condition is reached so that at least a portion of said expanded core section of at least one of said optical fibers is in said fused section; wherein each of the optical fibers optically couples with at least one other said optical fiber through surface interaction type optical coupling in said fused section and
   heating said optical fibers so that a section of the core of at least one of said optical fibers extending from and beyond said fused section along said optical fiber in at least one direction thermally expands.

27. The method of fabricating an optical fiber coupler as claimed in claim 26, further comprising, elongating at least one of said optical fibers while forming said fused section.

28. The method of fabricating an optical fiber coupler as claimed in claim 27, wherein, said heating terminates before the average cross-sectional area of said fused section averaged over said fused section becomes below approximately seventy percent of the sum of the cross-sectional areas of all said optical fibers.

29. The method of fabricating an optical fiber coupler as claimed in claim 28, wherein said heating terminates before the average cross-sectional area of said fused section averaged over said fused section becomes below approximately eighty five percent of the sum of the cross-sectional areas of all said optical fibers.

30. A method of fabricating an optical fiber coupler, comprising: providing a plurality of optical fibers with at least one of said optical fibers having at least an expanded core section and at least one of said optical fibers being suitable for multimode operations;
   maintaining sections of said optical fibers in contact and simultaneously heating at least a portion of said sections that are in contact to form a fused section until a predetermined end condition is reached so that at least a portion of said expanded core section of at least one of said optical fibers is in said fused section; and
   heating said optical fibers so that a section of the core of at least one of said optical fibers extending from and beyond said fused section alone said optical fiber in at least one direction thermally expands;
   wherein, said heating terminates after a condition selected from a set of conditions consisting of: said optical fiber coupler substantially reaches a predetermined set of optical characteristics, said fused section is substantially over-fused, said heating substantially completes a predetermined temperature profile, said optical fiber coupler substantially reaches a predetermined set of physical characteristics, and said fused section substantially reaches a predetermined length.

31. The method of fabricating an optical fiber coupler as claimed in claim 26, further comprising:
   pretreating a section of at least one of said optical fibers before said maintaining said expanded core sections of said plurality of optical fibers in contact;
   wherein:
      at least a portion of the pretreated section is in said fused section.

32. A method of fabricating an optical fiber coupler, comprising:
   providing a plurality of optical fibers with at least one of said optical fibers having at least an expanded core section and at least one of said optical fibers being suitable for multimode operations;
   maintaining sections of said optical fibers in contact and simultaneously heating at least a portion of said sections that are in contact to form a fused section until a predetermined end condition is reached so that at least a portion of said expanded core section of at least one of said optical fibers is in said fused section;
   heating said optical fibers so that a section of the core of at least one of said optical fibers extending from and beyond said fused section alone said optical fiber in at least one direction thermally expands; and
   pretreating a section of at least one of said optical fibers before said maintaining said expanded core sections of said plurality of optical fibers in contact;
   wherein:
      at least a portion of the pretreated section is in said fused section; and
      the method of pretreating a section of an optical fiber comprises a method selected from a set of methods consisting of: chemical etching, mechanical abrasion, and elongation under high temperatures.

33. A method of fabricating an optical fiber coupler, comprising:
   providing a plurality of optical fibers with at least one of said optical fibers having at least an expanded core section and at least one of said optical fibers being suitable for multimode operations;
   maintaining sections of said optical fibers in contact and simultaneously heating at least a portion of said sections that are in contact to form a fused section until a predetermined end condition is reached so that at least a portion of said expanded core section of at least one of said optical fibers is in said fused section; and
   heating said optical fibers so that a section of the core of at least one of said optical fibers extending from and beyond said fused section alone said optical fiber in at least one direction thermally expands;

wherein, the method of maintaining said sections of said optical fibers in contact comprises a method selected from a set of methods consisting of: applying tension to at least one of said optical fibers from the two sides of said fused section, vertically stacking said sections that are in contact, laying said sections that are in contact side-by-side, twisting said sections that are in contact together, and forcing said sections that are in contact together with a fixture.

34. A method of fabricating an optical fiber coupler, comprising: providing a first multimode optical fiber having a first expanded core section and a second multimode optical fiber having a second expanded core section, the core diameter of said first expanded core section is substantially different from core diameter of said second expanded core section; and maintaining at least a portion of said first expanded core section and at least a portion of said second expanded core section in contact and simultaneously heating at least a portion of said sections that are in contact until a fused section is formed and a predetermined end condition is reached so that at least a portion of one of said expanded core sections extends from and beyond said fused section along one of said optical fibers in at least one direction.

35. The method of fabricating an optical fiber coupler as claimed in claim 34, wherein, said heating terminates before the average cross-sectional area of said fused section averaged over said fused section becomes below approximately seventy percent of the sum of the cross-sectional areas of all said multimode optical fibers.

36. The method of fabricating an optical fiber coupler as claimed in claim 34 further comprising, maintaining a third section of a third multimode optical fiber and said first expanded core section and said second expanded core section in contact and simultaneously heating at least a portion of said sections of said multimode optical fibers that are in contact until a fused section is formed between said sections and said predetermined end condition is reached.

37. The method of fabricating an optical fiber coupler as claimed in claim 34, wherein, said heating terminates after a condition selected from a set of conditions consisting of: said optical fiber coupler substantially reaches a predetermined set of optical characteristics, said fused section is substantially over-fused, said heating substantially completes a predetermined temperature profile, said optical fiber coupler substantially reaches a predetermined set of physical characteristics, and said fused section substantially reaches a predetermined length.

* * * * *